(12) United States Patent
Lai et al.

(10) Patent No.: US 7,689,211 B2
(45) Date of Patent: Mar. 30, 2010

(54) SECURE LOGIN METHOD FOR ESTABLISHING A WIRELESS LOCAL AREA NETWORK CONNECTION, AND WIRELESS LOCAL AREA NETWORK SYSTEM

(75) Inventors: Alexander I-Chi Lai, Taipei Hsien (TW); Pei-Ling Yu, Taipei Hsien (TW)

(73) Assignee: Acer Inc., Taipei Hsien (TW)

( * ) Notice: Subject to any disclaimer, the term of this patent is extended or adjusted under 35 U.S.C. 154(b) by 964 days.

(21) Appl. No.: 11/450,681

(22) Filed: Jun. 9, 2006

(65) Prior Publication Data

US 2007/0101136 A1    May 3, 2007

(30) Foreign Application Priority Data

Nov. 3, 2005    (TW)    ............................... 94138589 A

(51) Int. Cl.
  *H04L 9/00*    (2006.01)
(52) U.S. Cl. ...................................... 455/424; 713/168
(58) Field of Classification Search .............. 455/414.1, 455/424; 713/150, 161, 168, 172, 175, 189
  See application file for complete search history.

(56) References Cited

U.S. PATENT DOCUMENTS

2005/0147073 A1    7/2005    Hietalahti et al.

2006/0064463 A1 *    3/2006    Chan et al. .................. 709/206

OTHER PUBLICATIONS

Chinese Office Action of Apr. 17, 2009 corresponding to Chinese Patent Application No. 2005101289645.
Zheng, Hui-Fang, "Research on Data Encryption Technology," *Fujian Polytechnic of Information Technology*, Fuzhou, Fujian 350003, pp. 53-56 (Apr. 2004)—English Abstract Attached.

* cited by examiner

*Primary Examiner*—Sam Bhattacharya
(74) *Attorney, Agent, or Firm*—Pearne & Gordon LLP

(57) ABSTRACT

A secure login method for a wireless local area network is implemented using a first wireless terminal that has already been logged in to the wireless local area network and that has obtained a settings value, and a second wireless terminal that has yet to be logged in to the wireless local area network and that has a public key and a secret key conforming to an asymmetric public key technique. The method includes: (A) enabling the second wireless terminal to send the public key to the first wireless terminal; (B) enabling the first wireless terminal to encrypt the settings value into an encrypted text using the public key and to send the encrypted text to the second wireless terminal; and (C) enabling the second wireless terminal to decrypt the encrypted text using the secret key so as to recover the original settings value that serves as a basis for logging in to the wireless local area network.

9 Claims, 3 Drawing Sheets

SECURE LOGIN METHOD FOR ESTABLISHING A WIRELESS LOCAL AREA NETWORK CONNECTION, AND WIRELESS LOCAL AREA NETWORK SYSTEM

CROSS-REFERENCE TO RELATED APPLICATION

This application claims priority of Taiwanese Application No. 094138589, filed on Nov. 3, 2005.

BACKGROUND OF THE INVENTION

1. Field of the Invention

The invention relates to a method for logging a new device in to a wireless local area network (WLAN), more particularly to a login method in which login data is fully protected whenever a new device is logged in to a wireless local area network. The invention also relates to a wireless local area network system.

2. Description of the Related Art

To meet the requirements of information security and confidentiality, wireless local area network schemes, such as WiFi and 802.11a/b/g, usually require users to have security keys when accessing a wireless local area network so as to protect content of communications. For instance, 802.11a/b/g has key protection mechanisms of Wired-Equivalent Privacy (WEP) and Wi-Fi Protected Access (WPA).

Take the WEP key protection mechanism as an example. It primarily utilizes a multi-bit (40 bits) WEP key, and a multi-bit (24 or 128 bits) random number to generate a signature so as to encrypt data content of each packet transmitted between devices connected to a wireless local area network. By means of such a key protection mechanism, even if a third party is able to obtain the packet data, it is not possible to decrypt the encrypted content of the packet data without the WEP key.

Three current login schemes of establishing a key protection mechanism are exemplified by way of an example in which a wireless device is to log in to a wireless local area network environment.

In the first login scheme, the user inputs the settings value manually. The user must input a correct service set identifier (SSID) and a correct WEP key through the wireless device, which is to be added to the wireless local area network, before the wireless device can be logged in to the wireless local area network environment.

In the second login scheme, a mobile storage device is used to replicate a settings value of an SSID and a correct WEP key from a wireless device that has already logged into a wireless local area network to the wireless device that has yet to be logged in to the wireless local area network for setup purposes. Microsoft and Intel once proposed the use of a mobile storage device, such as a USB flash drive or the like, to transport or replicate the settings value to the wireless device that has yet to be logged in to a network.

In the third login scheme, "connect" buttons on two wireless devices that are to be interconnected and that are disposed in close proximity with each other are simultaneously pressed to establish automatic connection therebetween. At present, it is known that Broadcom company has proposed such a concept.

All of the above login schemes share a problem that there is not any effective secure authentication mechanism to permit safe transport or replication of the settings value of a wireless device that has already been logged in to a wireless local area network to a wireless device that has yet to be logged in to the wireless local area network, and to prevent theft of the settings value by a third party during the transport or replication process.

SUMMARY OF THE INVENTION

Therefore, the main object of the present invention is to provide a secure login method for establishing a wireless local area network connection, in which login data being transmitted is fully protected to prevent theft of the login data by a third party during transmission.

Another object of the present invention is to provide a wireless local area network system for implementing the secure login method.

According to a first aspect of the present invention, there is provided a secure login method for a wireless local area network system that includes a first wireless terminal, a second wireless terminal, and a transmission channel established between the first and second wireless terminals.

The first wireless terminal has already been logged in to a wireless local area network and has obtained a settings value therefor. The second wireless terminal has yet to be logged in to the wireless local area network, and has a public key and a secret key conforming to an asymmetric public key technique. The transmission channel permits data transmission between the first wireless terminal and the second wireless terminal.

The secure login method comprises the steps of: enabling the second wireless terminal to send the public key to the first wireless terminal; enabling the first wireless terminal to encrypt the settings value into an encrypted text using the public key, and to send the encrypted text to the second wireless terminal; and enabling the second wireless terminal to decrypt the encrypted text using the secret key so as to recover the original settings value that serves as a basis for logging in to the wireless local area network.

According to a second aspect of the present invention, there is provided a secure login method for a wireless local area network system that includes a first wireless terminal, a second wireless terminal, and a transmission channel established between the first and second wireless terminals.

The first wireless terminal has a first public key and a first secret key for decrypting content protected by the first public key, and has already obtained a settings value for logging in to a wireless local area network. The second wireless terminal has a second public key and a second secret key for decrypting content protected by the second public key. The transmission channel permits data transmission between the first and second wireless terminals.

The first wireless terminal executes the steps of: obtaining the settings value for logging in to the wireless local area network; transmitting the first public key to the second wireless terminal; receiving from the second wireless terminal a first encrypted text generated by the second wireless terminal by encrypting the second public key thereof using the first public key; using the first secret key to decrypt the first encrypted text so as to recover the second public key, and encrypting the settings value into a second encrypted text using the second public key; and transmitting the second encrypted text to the second wireless terminal for enabling the second wireless terminal to decrypt the second encrypted text using the second secret key so as to recover the settings value.

The second wireless terminal executes the steps of: obtaining the first public key from the first wireless terminal, and using the first public key to encrypt the second public key thereof into the first encrypted text; sending the first encrypted text to the first wireless terminal; and obtaining the second encrypted text generated by the first wireless terminal by encrypting the settings value using the second public key, and decrypting the second encrypted text using the second secret key so as to recover the settings value for use as a basis to log in to the wireless local area network.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
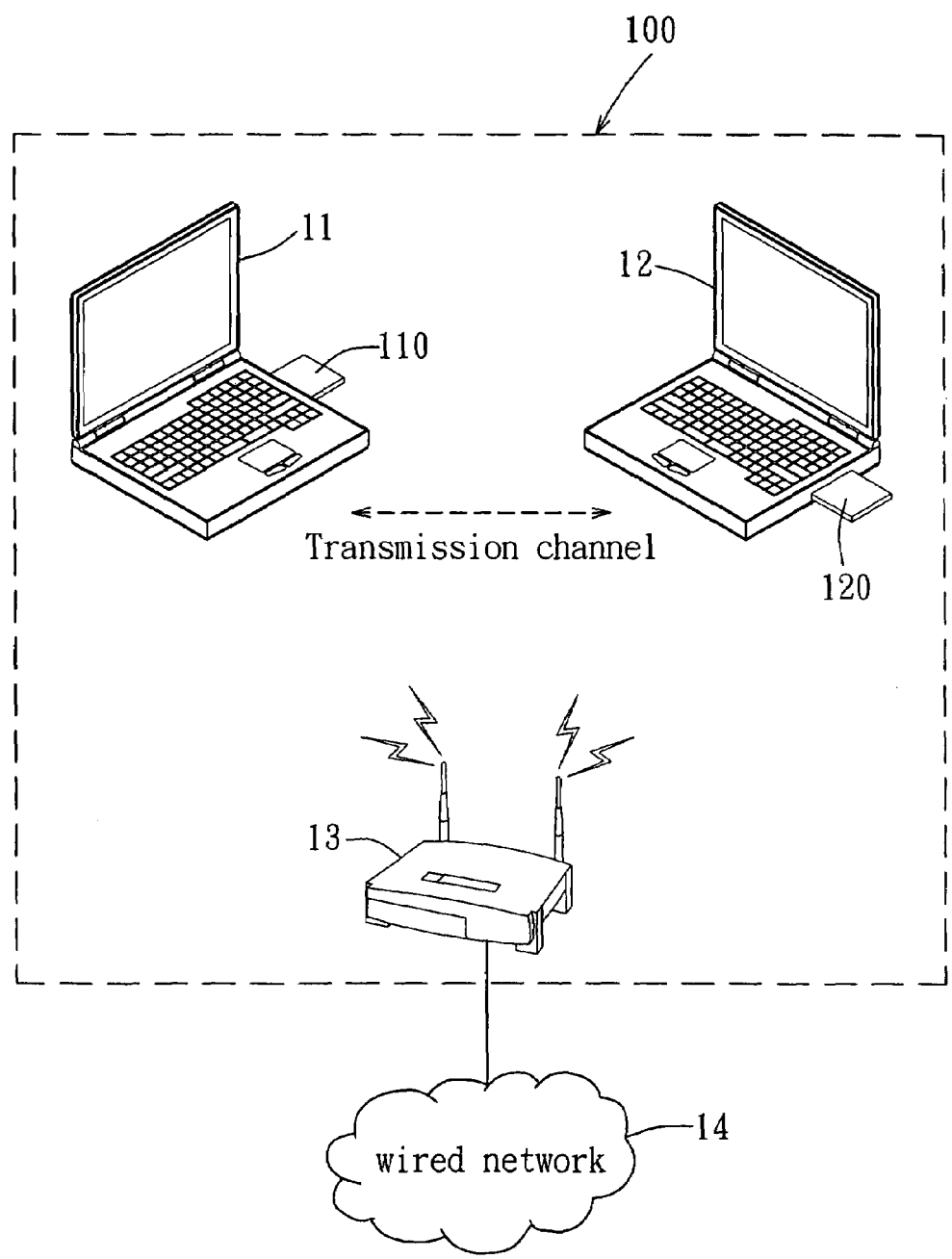
FIG. 1 is a schematic diagram of a wireless local area network system for implementing the secure login method of the present invention.

Referring to FIG. 1, the secure login method according to the present invention is implemented by a wireless local area network system which includes a first wireless terminal 11, a second wireless terminal 12, and a wireless transmission device 13.

In the first preferred embodiment of the method according to the present invention, the wireless transmission device 13 is an access point for connection to a wired network 14, and permits wireless transmission of data between wireless terminals that are already connected to the wireless transmission device 13 within a range covered by a wireless local area network 100.

The first wireless terminal 11 and the second wireless terminal 12 communicate wirelessly with the wireless transmission device 13 through their respective wireless network cards 110, 120. In addition, the first wireless terminal 11 and the second wireless terminal 12 are capable of point-to-point or ad-hoc transmission.

In addition, the first wireless terminal 11 has already been logged in to the wireless local area network 100, and has obtained a settings value (not shown) for logging in to the wireless local area network 100. The settings value includes a service set identifier (SSID) and a packet encryption code. The SSID serves to differentiate the wireless local area network 100 from other wireless local area networks so as to avoid interference. The packet encryption code can be a WEP key or a WPA key with higher security, and is used for encrypting data contents of packets transmitted by each wireless device that is connected to the wireless local area network 100.

It is noted that since the SSID and the packet encryption code are important data that are generally required for establishing connection to a wireless local area network, they may be stolen or misappropriated by an ill-intentioned third party if preventive measures are not taken. Therefore, the first preferred embodiment of the login method according to the present invention involves the use of an asymmetric key pair for a device (i.e., the second wireless terminal 12) that has yet to be connected to the wireless local area network 100 as a preventive measure, which is illustrated as follows.

The second wireless terminal 12 is a device that has yet to be connected to the wireless local area network 100, and stores a key pair, i.e., a public key (PK') and a secret key (SK'), which conform to an asymmetric public-key system. The public key (PK') is made known to the public, whereas the secret key (SK') is used to decrypt content protected by the public key (PK').

The first preferred embodiment employs a known asymmetric public key technique, namely, the RSA public key encryption algorithm (named after the initials of its developers, Ronald L. Rivest, Adi Shamir and Leonard M. Adleman). As such asymmetric public key technique is well known in the art, the principles behind it are not presented in detail herein, and only the application of the technique will be discussed.

Figure 2:
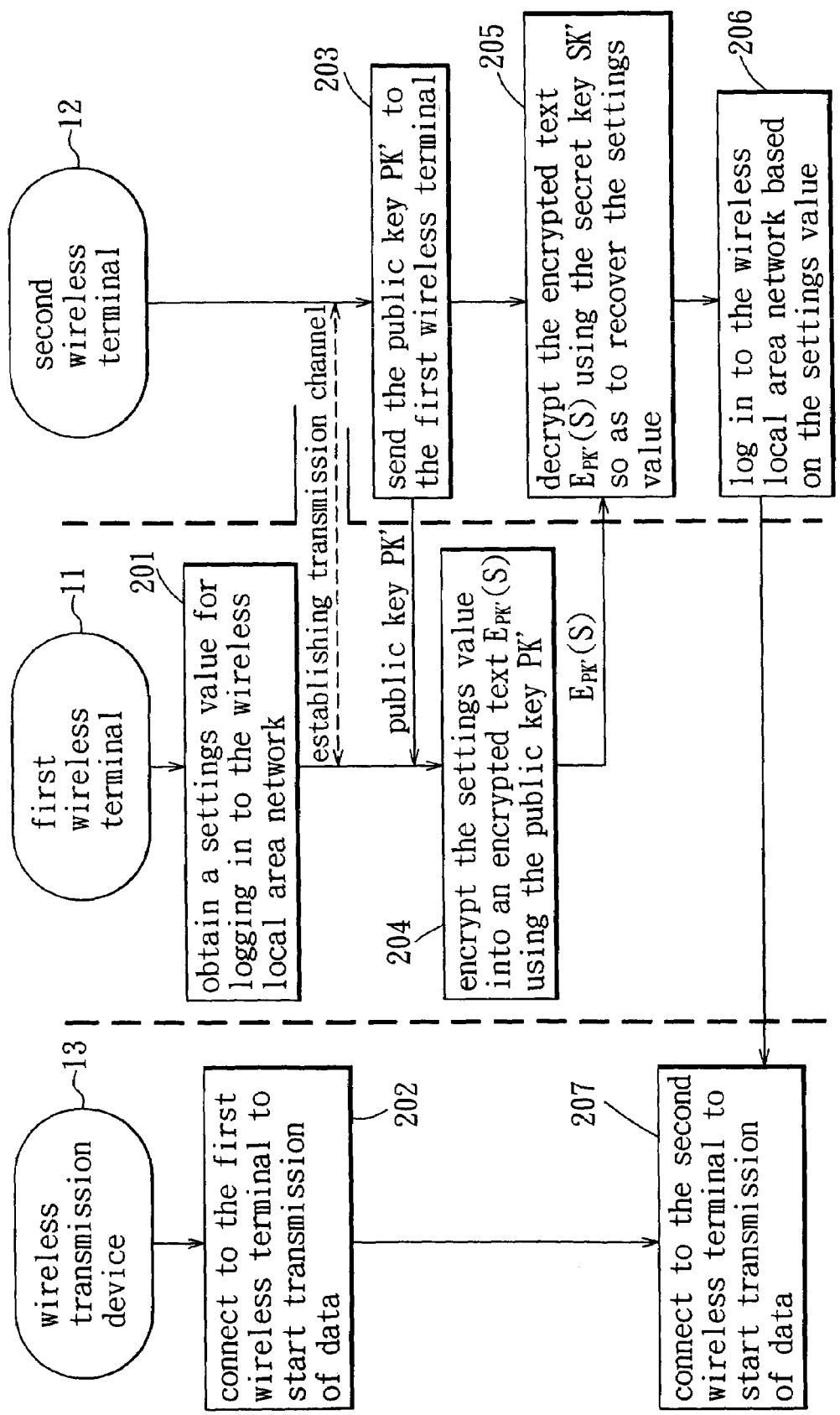
FIG. 2 is a flowchart to illustrate steps of the first preferred embodiment of a secure login method for a wireless local area network according to the present invention.
Figure 3:
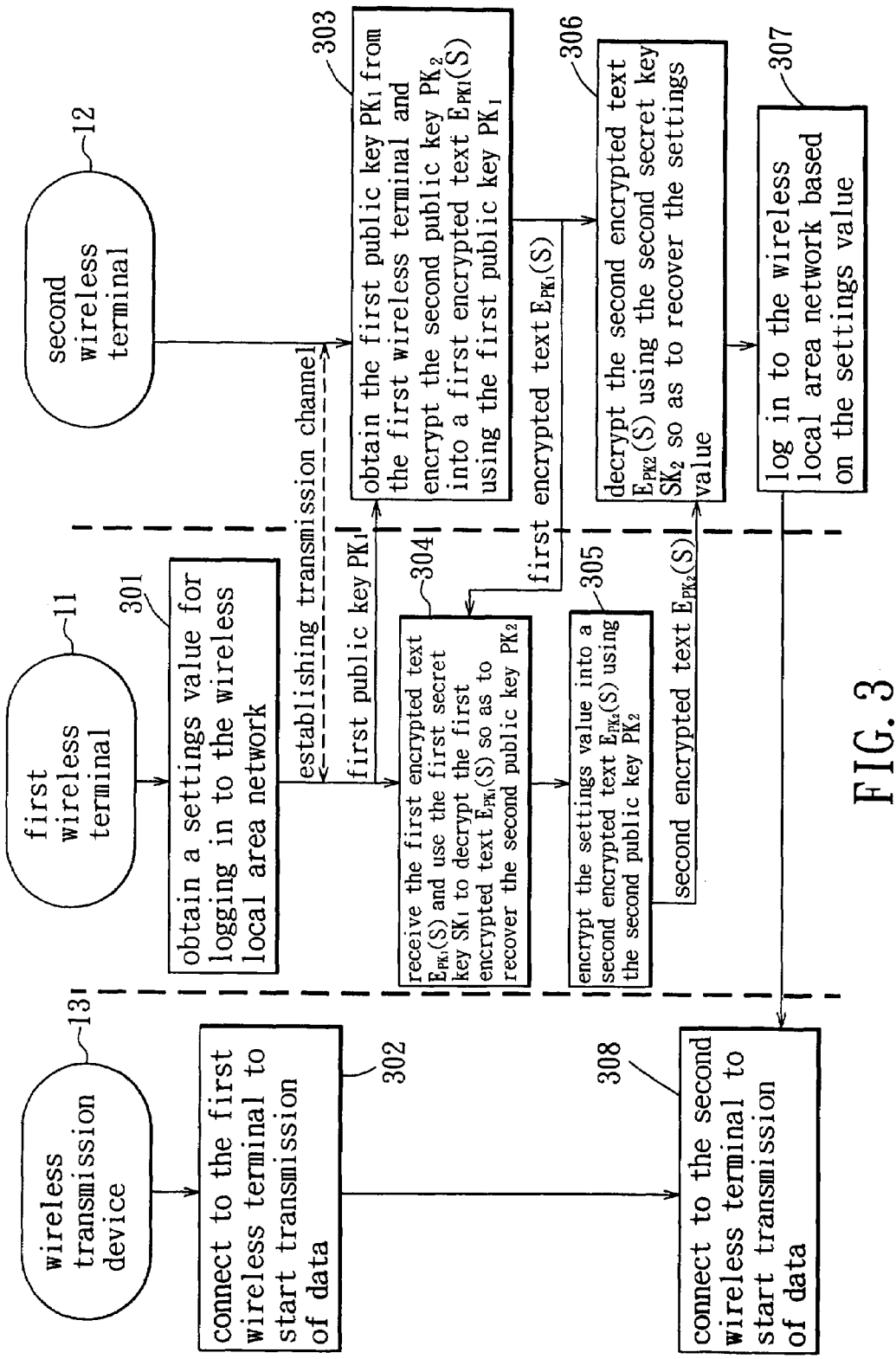
FIG. 3 is a flowchart to illustrate steps of the second preferred embodiment of a secure login method for a wireless local area network according to the present invention.

FIGS. 1 and 2 illustrate the process flow and steps of establishing a connection between the second wireless terminal 12 and the wireless transmission device 13.

Initially, in step 201, the first wireless terminal 11 obtains a settings value for logging in to the wireless local area network 100. The settings value in this preferred embodiment includes the SSID and the packet encryption code, which can be obtained through conventional wired or wireless transmission or transport. In step 202, connection between the wireless transmission device 13 and the first wireless terminal 11 is established using the settings value to permit data transmission therebetween.

It is noted that prior to establishing the connection between the second wireless terminal 12 and the wireless transmission device 13, the first and second wireless terminals 11, 12 must establish a transmission channel therebetween by means of a connection setup, e.g., by activating a point-to-point transmission function between the first and second wireless terminals 11, 12.

After the transmission channel is established, in step 203, the second wireless terminal 12 sends the public key (PK') thereof to the first wireless terminal 11. After receipt of the public key (PK'), in step 204, the first wireless terminal 11 uses the public key (PK') to encrypt the settings value into an encrypted text $E_{PK'}(S)$, and sends the encrypted text $E_{PK'}(S)$ to the second wireless terminal 12.

In step 205, after receipt of the encrypted text $E_{PK'}(S)$, the second wireless terminal 12 uses the secret key (SK') thereof to decrypt the encrypted text $E_{PK'}(S)$ so as to recover the original settings value. Then, in step 206, the second wireless terminal 12 can log in to the wireless local area network 100 based on the settings value. In step 207, connection between the wireless transmission device 13 and the second wireless terminal 12 is established to permit data transmission.

The first preferred embodiment of the secure login method according to the present invention is intended to provide a preventive measure by employing an asymmetric key pair in a device (i.e., the second wireless terminal 12) that has yet to be connected to the wireless local area network 100. In consideration of certain environments that require two-way identity authentication, the second preferred embodiment of the present invention is to provide each of the device that has already been logged in to the wireless local area network 100 (i.e., the first wireless terminal 11) and the device that has yet to be logged in to the wireless local area network 100 (i.e., the second wireless terminal 12) with an asymmetric key pair so as to enable each of the devices to encrypt the data intended to be transmitted using the public key of the other party, thereby achieving enhanced protection.

Referring once again to FIG. 1, similar to the first preferred embodiment, the second preferred embodiment is used in the wireless local area network system including the first wireless terminal 11, the second wireless terminal 12, and the wireless transmission device 13. The wireless transmission device 13 permits wireless transmission of data between wireless terminals that are already connected to the wireless transmission device 13 within a range covered by the wireless local area network 100.

The second preferred embodiment differs from the first preferred embodiment in that each of the first wireless terminal 11 and the second wireless terminal 12 that has yet to be logged in to the wireless local area network 100 has an asymmetric key pair. Specifically, the first wireless terminal 11 has a first public key $PK_1$ and a first secret key $SK_1$ for decrypting content protected by the first public key $PK_1$. The second wireless terminal 12 has a second public key $PK_2$ and a second secret key $SK_2$ for decrypting content protected by the second public key $PK_2$.

Regarding the content of the settings value, the establishment of the transmission channel, etc. in the second preferred embodiment of the method according to the present invention, reference can be made to the above description. The second preferred embodiment of the method according to the present invention is illustrated as follows.

Initially, in step 301, the first wireless terminal 11 obtains a settings value for logging in to the wireless local area network 100. In step 302, based on the settings value, the first wireless terminal 11 is connected to the wireless transmission device 13 to start transmission of data. By establishing a transmission channel (e.g., point-to-point transmission), the first and second wireless terminals 11, 12 can transmit data to each other.

Accordingly, in step 303, the second wireless terminal 12 obtains the first public key $PK_1$ from the first wireless terminal 11, and encrypts the second public key $PK_2$ thereof into a first encrypted text $E_{PK1}(S)$ using the first public key $PK_1$.

Then, in step 304, the first wireless terminal 11 receives the first encrypted text $E_{PK1}(S)$, and decrypts the first encrypted text $E_{PK1}(S)$ using the first secret key $SK_1$ thereof so as to recover the second public key $PK_2$. In step 305, the first wireless terminal 11 further uses the second public key $PK_2$ thus obtained to encrypt the settings value into a second encrypted text $E_{PK2}(S)$.

Subsequently, in step 306, the second wireless terminal 12 obtains the second encrypted text $E_{PK2}(S)$ and decrypts the second encrypted text $E_{PK2}(S)$ using the second secret key $SK_2$ to recover the settings value. In step 307, the second wireless terminal 12 uses the settings value as a basis for logging in to the wireless local area network 100. Finally, in step 308, the wireless transmission device 13 and the second wireless terminal 12 establish a connection therebetween to permit data transmission.

If the first wireless terminal 11 and the second wireless terminal 12 are considered independently, the process flows respectively performed by the first wireless terminal 11 and the second wireless terminal 12 in the secure login method of the second preferred embodiment are as follows.

The steps executed by the first wireless terminal 11 are: obtaining a settings value for logging in to the wireless local area network 100 (step 301); providing the first public key $PK_1$ to the second wireless terminal 12; receiving a first encrypted text $E_{PK1}(S)$ generated by the second wireless terminal 12 by encrypting the second public key $PK_2$ using the first public key $PK_1$ (step 304); decrypting the first encrypted text $E_{PK1}(S)$ using the first secret key $SK_1$ so as to recover the second public key $PK_2$, and encrypting the settings value into a second encrypted text $E_{PK2}(S)$ using the second public key $PK_2$ (step 305); and transmitting the second encrypted text $E_{PK2}(S)$ to the second wireless terminal 12 such that the second wireless terminal 12 can use the second secret key $SK_2$ to recover the settings value from the second encrypted text $E_{PK2}(S)$.

The steps executed by the second wireless terminal 12 are: obtaining the first public key $PK_1$ from the first wireless terminal 11, and encrypting the second public key $PK_2$ into the first encrypted text $E_{PK1}(S)$ using the first public key $PK_1$ (step 303); transmitting the first encrypted text $E_{PK1}(S)$ to the first wireless terminal 11; obtaining the second encrypted text $E_{PK2}(S)$ generated by the first wireless terminal 11 by encrypting the settings value using the second public key $PK_2$, and decrypting the second encrypted text $E_{PK2}(S)$ using the second secret key $SK_2$ so as to recover the settings value (step 306); connecting to the wireless local area network 100 based on the settings value for transmission of data (step 307); and using the settings value to connect to the wireless transmission device 13 (step 308).

In order to make sure that a request for connection from the second wireless terminal 12 was initiated by a legitimate administrator, the first wireless terminal 11 further has a code $PW_1$ that is set by the user. When the second wireless terminal 12 obtains the first public key $PK_1$ from the first wireless terminal 11 through the transmission channel in step 303, the second wireless terminal 12 also obtains the code $PW_1$. Besides, the second wireless terminal 12 generates the first encrypted text $E_{PK1}(S)$ using the second public key $PK_2$ thereof and the code $PW_1$.

On the other hand, when the first wireless terminal 11 uses the first secret key $SK_1$ to decrypt the first encrypted text $E_{PK1}(S)$ in step 304, it recovers both the second public key $PK_2$ and the code $PW_1$. The first wireless terminal 11 also authenticates the code $PW_1$ to inspect whether the code $PW_1$ is correct. If correct, the first wireless terminal 11 continues with the subsequent steps. Otherwise, the subsequent steps are not performed.

An advantage of providing the code $PW_1$ set by the user is that if the first wireless terminal 11 obtains the correct code $PW_1$ upon decryption of the first encrypted text $E_{PK1}(S)$ using the first secret key $SK_1$ thereof, it can confirm that the connection request from the second wireless terminal 12 was indeed initiated by a legitimate administrator.

In sum, in order to provide an effective secure authentication mechanism between two wireless devices that are to be interconnected so that the settings value can be safely replicated from the wireless device that has been logged in to the wireless local area network to the wireless device that has yet to be logged in to the wireless local area network without being stolen by another party during the process of transmitting the settings value, the secure login method of the present invention adopts a key pair conforming to the asymmetric public-key system to protect the settings value so that the wireless transmission function is made more secure.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for logging a wireless terminal in to a wireless local area network, said method being adapted to be implemented using a first wireless terminal that has a first public key and a first secret key for decrypting content protected by the first public key, and a second wireless terminal that has yet to be logged in to the wireless local area network and that has a second public key and a second secret key for decrypting content protected by the second public key, comprising steps executed by the first wireless terminal, including:

(A) obtaining a settings value for logging in to the wireless local area network;

(B) providing the first public key to the second wireless terminal;

(C) receiving a first encrypted text which was generated by the second wireless terminal by encrypting the second public key of the second wireless terminal using the first public key;

(D) decrypting the first encrypted text using the first secret key so as to recover the second public key, and encrypting the settings value into a second encrypted text using the second public key; and (E) sending the second encrypted text to the second wireless terminal for enabling the second wireless terminal to decrypt the second encrypted text using the second secret key so as to recover the settings value.

2. A method for logging a wireless terminal in to a wireless local area network, said method being adapted to be implemented using a first wireless terminal that has already obtained a settings value for logging in to the wireless local area network and that has a first public key and a first secret key for decrypting content protected by the first public key, and a second wireless terminal that has yet to be logged in to the wireless local area network and that has a second public key and a second secret key for decrypting content protected by the second public key, comprising steps executed by the second wireless terminal, including:

(A) obtaining the first public key from the first wireless terminal, and encrypting the second public key thereof into a first encrypted text using the first public key;

(B) transmitting the first encrypted text to the first wireless terminal;

(C) obtaining a second encrypted text which was generated by the first wireless terminal by encrypting the settings value using the second public key, and decrypting the second encrypted text using the second secret key so as to recover the settings value; and (D) connecting to the wireless local area network based on the settings value.

3. A secure login method for a wireless local area network, comprising the steps of:

(A) providing a first wireless terminal, the first wireless terminal having a first public key and a first secret key for decrypting content protected by the first public key;

(B) providing a second wireless terminal, the second wireless terminal having a second public key and a second secret key for decrypting content protected by the second public key;

(C) enabling the first wireless terminal to obtain a settings value for logging in to the wireless local area network;

(D) enabling the second wireless terminal to obtain the first public key from the first wireless terminal, and to encrypt the second public key into a first encrypted text using the first public key;

(E) enabling the first wireless terminal to obtain the first encrypted text from the second wireless terminal, and to decrypt the first encrypted text using the first secret key so as to recover the second public key, and further enabling the first wireless terminal to encrypt the settings value into a second encrypted text using the second public key;

(F) enabling the second wireless terminal to obtain the second encrypted text from the first wireless terminal, and to decrypt the second encrypted text using the second secret key so as to recover the settings value; and (G) enabling the second wireless terminal to connect to the wireless local area network based on the settings value.

4. A wireless local area network system, comprising:

a first wireless terminal that has already been logged in to a wireless local area network and that has obtained a settings value of the wireless local area network;

a second wireless terminal that has yet to be logged in to the wireless local area network and that has a public key and a secret key conforming to an asymmetric public key technique; and a transmission channel for transmission of data between said first wireless terminal and said second wireless terminal;

wherein said second wireless terminal is operable so as to send the public key to said first wireless terminal through said transmission channel such that said first wireless terminal encrypts the settings value into an encrypted text using the public key, and sends the encrypted text to said second wireless terminal through said transmission channel; and wherein said second wireless terminal is further operable so as to decrypt the encrypted text using the secret key after receipt of the encrypted text from said first wireless terminal so as to recover the original settings value, and so as to connect to the wireless local area network based on the settings value.

5. The wireless local area network system according to claim 4, wherein the settings value includes at least one of a service set identifier (SSID) and a packet encryption code.

6. A wireless local area network system, comprising:

a first wireless terminal that has a first public key and a first secret key for decrypting content protected by the first public key and that has obtained a settings value for logging in to a wireless local area network;

a second wireless terminal that has a second public key and a second secret key for decrypting content protected by the second public key; and a transmission channel for transmission of data between said first wireless terminal and said second wireless terminal;

wherein said second wireless terminal obtains the first public key of said first wireless terminal through said transmission channel, and encrypts the second public key thereof into a first encrypted text using the first public key;

wherein said first wireless terminal obtains the first encrypted text through said transmission channel, and decrypts the first encrypted text using the first secret key so as to recover the second public key, said first wireless terminal encrypting the settings value into a second encrypted text using the second public key; and wherein said second wireless terminal obtains the second encrypted text through said transmission channel, and decrypts the second encrypted text using the second secret key so as to recover the settings value, said second wireless terminal connecting to the wireless local area network based on the settings value.

7. The wireless local area network system according to claim 6, wherein said first wireless terminal further has a code that is set by the user, said second wireless terminal obtaining the code upon obtaining the first public key of said first wireless terminal through said transmission channel.

8. The wireless local area network system according to claim 7, wherein said second wireless terminal encrypts the second public key into the first encrypted text using the first public key and the code.

9. The wireless local area network system according to claim 8, wherein said first wireless terminal decrypts the first encrypted text using the first secret key so as to recover the second public key and the code, and authenticates the code to inspect whether the code is one belonging to said first wireless terminal such that said first wireless terminal proceeds with subsequent operations only if the code is one belonging thereto.

* * * * *